(12) United States Patent
Iwakata et al.

(10) Patent No.: US 8,152,226 B2
(45) Date of Patent: Apr. 10, 2012

(54) CAB FOR CONSTRUCTION MACHINE, AND CONSTRUCTION MACHINE AND MOTOR GRADER EACH HAVING THE CAB MOUNTED THEREON

(75) Inventors: Osamu Iwakata, Komatsu (JP); Yasuyuki Satake, Komatsu (JP); Kazuhiro Takemoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 276 days.

(21) Appl. No.: 12/599,189

(22) PCT Filed: Apr. 14, 2008

(86) PCT No.: PCT/JP2008/057302
§ 371 (c)(1),
(2), (4) Date: Feb. 17, 2010

(87) PCT Pub. No.: WO2008/139814
PCT Pub. Date: Nov. 20, 2008

(65) Prior Publication Data
US 2010/0156144 A1 Jun. 24, 2010

(30) Foreign Application Priority Data
May 9, 2007 (JP) ................................ 2007-124534

(51) Int. Cl.
*B60N 99/00* (2006.01)
(52) U.S. Cl. .................................................... 296/190.1
(58) Field of Classification Search ............. 296/190.01, 296/190.08, 190.1, 190.11; 180/89.12
See application file for complete search history.

(56) References Cited

U.S. PATENT DOCUMENTS

| 5,286,081 | A | * | 2/1994 | Martin, Jr. ............... 296/190.08 |
| 5,413,188 | A | * | 5/1995 | Ui ............................. 180/89.12 |
| 6,065,799 | A | | 5/2000 | Suwabe et al. |
| 6,409,254 | B2 | * | 6/2002 | Tiziano .................... 296/190.08 |
| D531,647 | S | | 11/2006 | Stender et al. |
| 7,243,982 | B2 | * | 7/2007 | Kelley et al. ............. 296/190.08 |

FOREIGN PATENT DOCUMENTS

| JP | 5-106240 | 4/1993 |
| JP | 10-167125 | 6/1998 |
| JP | 11-158922 | 6/1999 |

OTHER PUBLICATIONS

International Search Report (International Application No. PCT/JP2008/057302) dated Jul. 15, 2009, 1 page.

* cited by examiner

*Primary Examiner* — Lori Lyjak
(74) *Attorney, Agent, or Firm* — Fish & Richardson P.C.

(57) ABSTRACT

A cab for a construction machine, a construction machine, and a motor grader are described. The construction machine and the motor grader each have the cab mounted thereon. The cab includes a floor and a roof, each having a respective front side having corresponding left and right ends, which are diagonally cut forward. A front window is provided on a front surface of the cab is formed in a trapezoidal shape. Upper and lower window frames are disposed along both the left and right ends of the floor and the roof. Frames are also disposed on front sides of side window frames along both left and right side window frames of the front window. When mounted on a construction machine or motor grader used for road surface and ground operations, the cab increases visibility of the area to be operated upon, specifically, visibility in the forward view.

6 Claims, 5 Drawing Sheets

CAB FOR CONSTRUCTION MACHINE, AND CONSTRUCTION MACHINE AND MOTOR GRADER EACH HAVING THE CAB MOUNTED THEREON

This application is a U.S. National stage application of PCT Application No. PCT/JP2008/057302, filed on Apr. 14, 2008, now pending, which is an International Application based on Japanese Application No. 2007-124534, filed on May 9, 2007, all of which are incorporated by reference.

TECHNICAL FIELD

The present invention relates to a cab for a construction machine, a construction machine and a motor grader each having the cab mounted thereon which carry out operation for a road surface and the ground such as a bulldozer and a motor grader. Particularly, the invention relates to a cab for a construction machine, a construction machine and a motor grader each having the cab mounted thereon capable of checking an working state from the inside of the cab and in which forward view is enhanced and view for a working location is enhanced.

In the present invention, a term "forward" is used for indicating forward of a construction machine, and terms "left and right directions" are used for indicating left and right directions when viewing the cab from behind the construction machine. Concerning terms "upward and downward direction", the term "upward" is used for indicating a direction of upward in the vertical direction, and the term "downward" is used for indicating a direction of the ground.

BACKGROUND ART

As a construction machine having a cab according to the present invention, there are a motor grader, a bulldozer and the like. In the following description, the motor grader will be described as an example of the construction machine. Generally, the motor grader is a civil engineering machine having wheels for readjusting a land such that a road surface or the ground becomes flat. A blade which readjusts a land can move in the vertical direction, incline in the vertical direction, incline in the longitudinal direction of the vehicle, slide in the left and right direction of the vehicle, and turn around a predetermined pivot.

In order to precisely and efficiently apply a finishing works to a road surface or the ground using the motor grader, an operator carries out the work while seeing the working state after the work or the state of the working place in front of the operator before the operation is carried out. The operator corrects the set angle of the blade while visually checking whether the readjusted state after the work using the blade is formed flatly.

Generally, the motor grader is made to run at high speed on a general road in many cases. Therefore, in the motor grader, it is necessary to secure the visibility on a road surface to be readjusted behind the blade at the time of the readjusting work of the land, and the forward view at the time of running.

A motor grader having a front window largely widened is used in many cases so as to secure the forward view. To check a land-readjusting state after the work, a motor grader having a structure capable of securing forward and downward view by extending the side window glass to a floor area is widely employed. Patent Document 1 (Japanese Patent Laid-Open Publication No. 11-158922), Patent Document 2 (Japanese Patent Laid-Open Publication No. 10-167125) and Patent Document 3 (U.S. Design Pat. No. D531,647) discloses examples of the cab for the motor grader having such a structure.

Patent Document 4 (Japanese Patent Laid-Open Publication No. 5-106240) discloses a cab for a bulldozer having excellent view for both ends of the blade.

Patent Document 1: Japanese Patent Laid-Open Publication No. 11-158922
Patent Document 2: Japanese Patent Laid-Open Publication No. 10-167125
Patent Document 3: U.S. Design Pat. No. D531,647S
Patent Document 4: Japanese Patent Laid-Open Publication No. 5-106240

DISCLOSURE OF THE INVENTION

Problem to be Solved by the Invention

In the conventional cab for the motor grader disclosed in Patent Documents 1 to 3, the front window is largely widened to secure the forward view, and the front window is extended to a floor area. Therefore, the width in front of the floor is necessarily increased. As the width in front of the floor is increased, the visibility of the road surface to be readjusted behind the blade is deteriorated.

On the other hand, if a cab disclosed in Patent Document 4 is used to secure the visibility of the road surface to be readjusted behind the blade, the area of the front window is reduced. Therefore, pillars disposed on both sides of the front window hinder the forward view, and the forward view when running at high speed is deteriorated.

The present invention provides a cab for a construction machine capable of sufficiently securing forward view and working view from inside the cab of the construction machine, capable of increasing a lateral width of the upper window in the left and right direction at the point of view of the operator facing forward in their seated position, and capable of increasing the working view with respect to an working area located below the front edge of the floor.

Means for Solving the Problem

The problem of the present application can be solved by inventions described in claims 1 to 4.

That is, as a main characteristic, the first invention of the present application provides a cab for a construction machine, wherein both left and right ends of a front side of a floor of the cab are diagonally cut forward, both left and right ends of a front side of a roof of the cab are diagonally cut forward, a front window is provided on a front surface of the cab, when an upper window frame of the front window is an upper side and a lower window frame of the front window is a lower side as viewed from front, the front window is formed into a trapezoidal shape in which a width of the upper side is wider than a width of the lower side, and the upper window frame is disposed rearward of the lower window frame as viewed from side, the cab comprises a pair of left and right side front windows in which upper and lower window frames are disposed along both the left and right ends of the floor which are diagonally cut forward and along both the left and right ends of the roof which are diagonally cut forward, and upper end sides of side window frames on front sides of the side window frames of the side front windows are disposed along both left and right side window frames of the front window.

A second invention of the application specifies a layout structure of the front window as a main characteristic.

Third and fourth inventions of the application specify a machine having a cab mounted thereon as a main characteristic.

EFFECT OF THE INVENTION

In the invention of the application, the area of the front window is set large, and forward view at the time of running is secured. Further, the forward width of the floor is set small, so that visibility of a road surface to be readjusted behind the blade can be enhanced. That is, it is possible to secure the visibility of a road surface to be readjusted behind the blade at the time of the land-readjusting work, and to secure the forward view at the time of running. Further, both the visibility and the forward view can be enhanced.

It is desirable that the front window is inclined rearward at 15° to 20° with respect to the vertical direction as viewed from side. Accordingly, reflection of the sunlight on the front window is not generated and a large area of the front window can be secured. Thus, it is possible to enhance the forward view.

EXPLANATION OF REFERENCE NUMERALS

Figure 1:
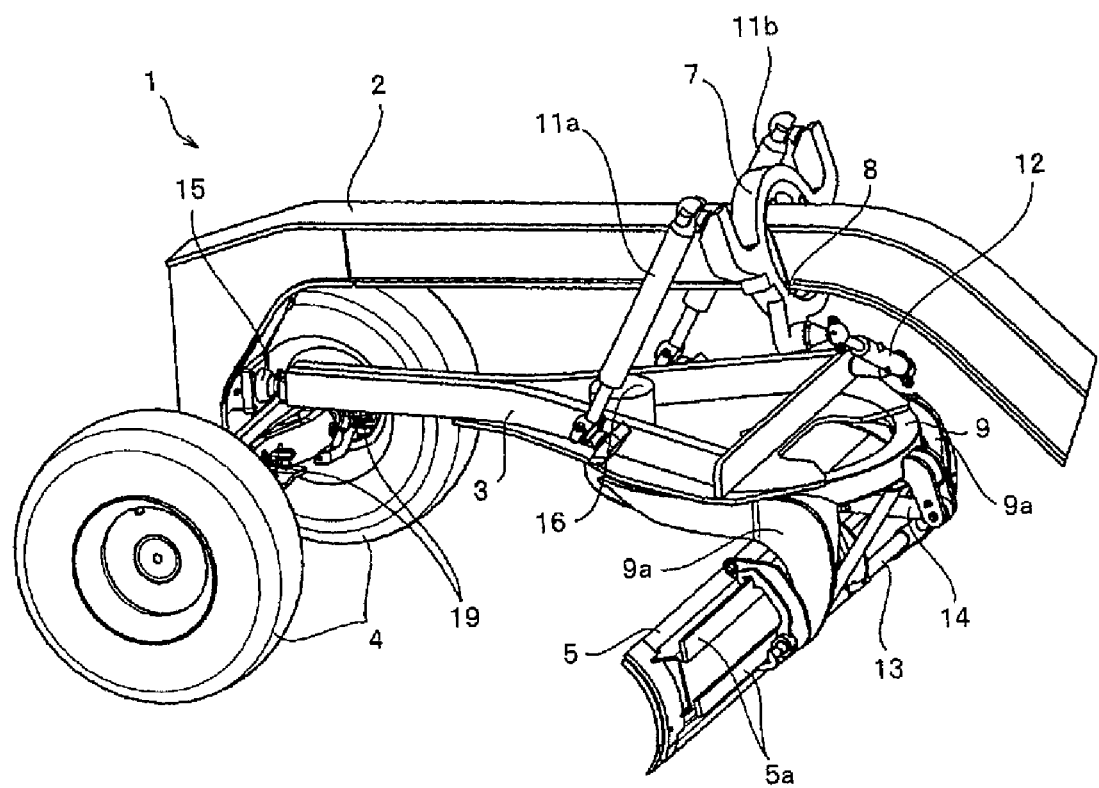
FIG. 1 is a perspective view showing an operating machine portion of a motor grader (first embodiment)

1: Motor grader
2: Front frame
5: Blade
17: Driving section
20: Cab
22: Floor
22b: Cut section
24: Side front window (which also functions as a door)
25: Side front window
25a: Cross rail
26: Door window frame
30: A-pillar
31: B-pillar
32: C-pillar
35: Front window

BEST MODE FOR CARRYING OUT THE INVENTION

Preferred embodiment of the present invention will be described specifically based on the accompanying drawings. A structure of a construction machine of the present invention will be described based on a motor grader, but the application scope of the invention is not limited to the motor grader. The invention may be applied to a construction machine which carries out operation for a road surface and the ground, and the invention can suitably be applied to a bulldozer for example.

A shape, a layout structure capable of solving the problem of the present invention other than those described below can also be employed. Thus, the invention is not limited to the later-described embodiment, and the invention can variously be modified.

First Embodiment

Figure 2:
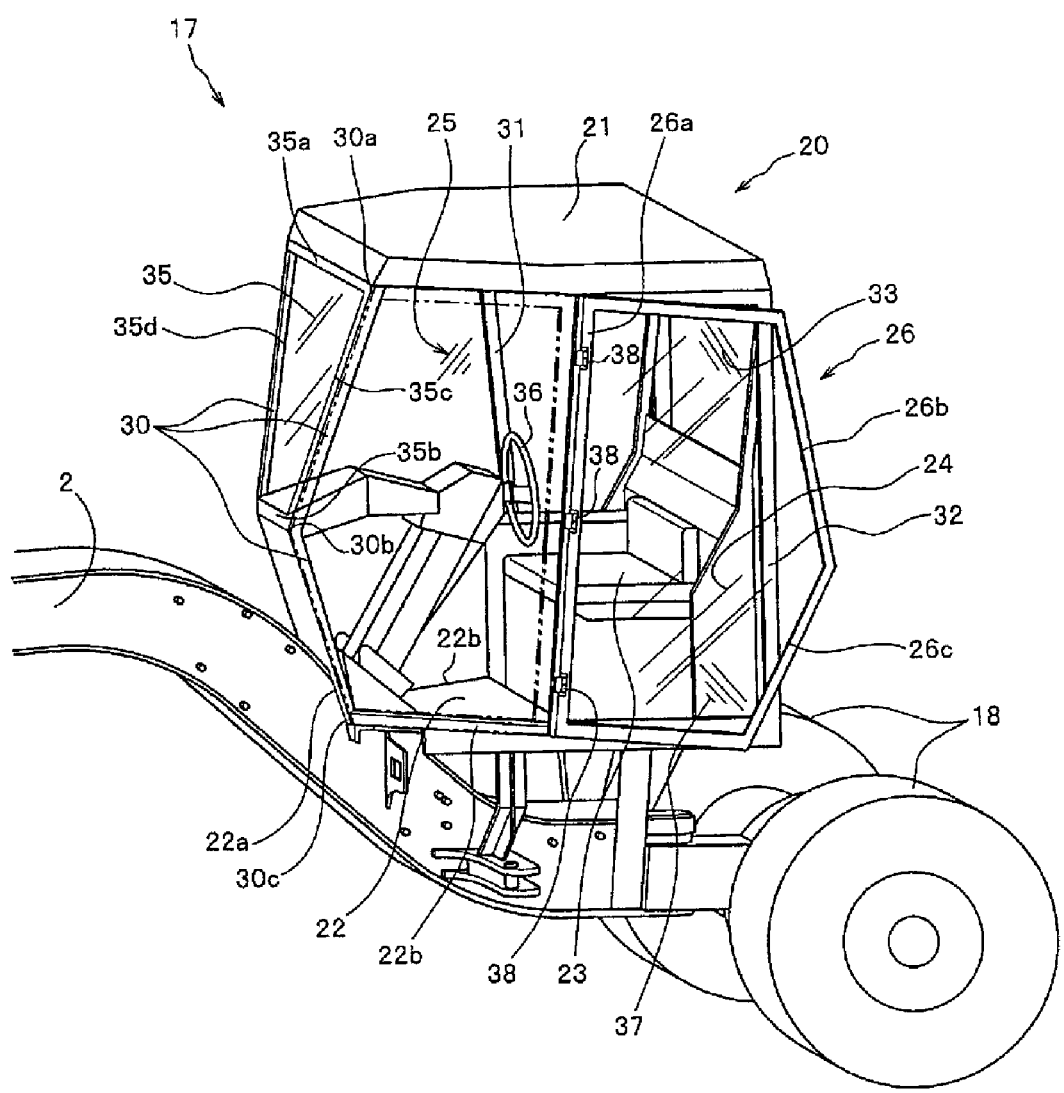
FIG. 2 is perspective view showing a driving section of the motor grader (first embodiment)
Figure 3:
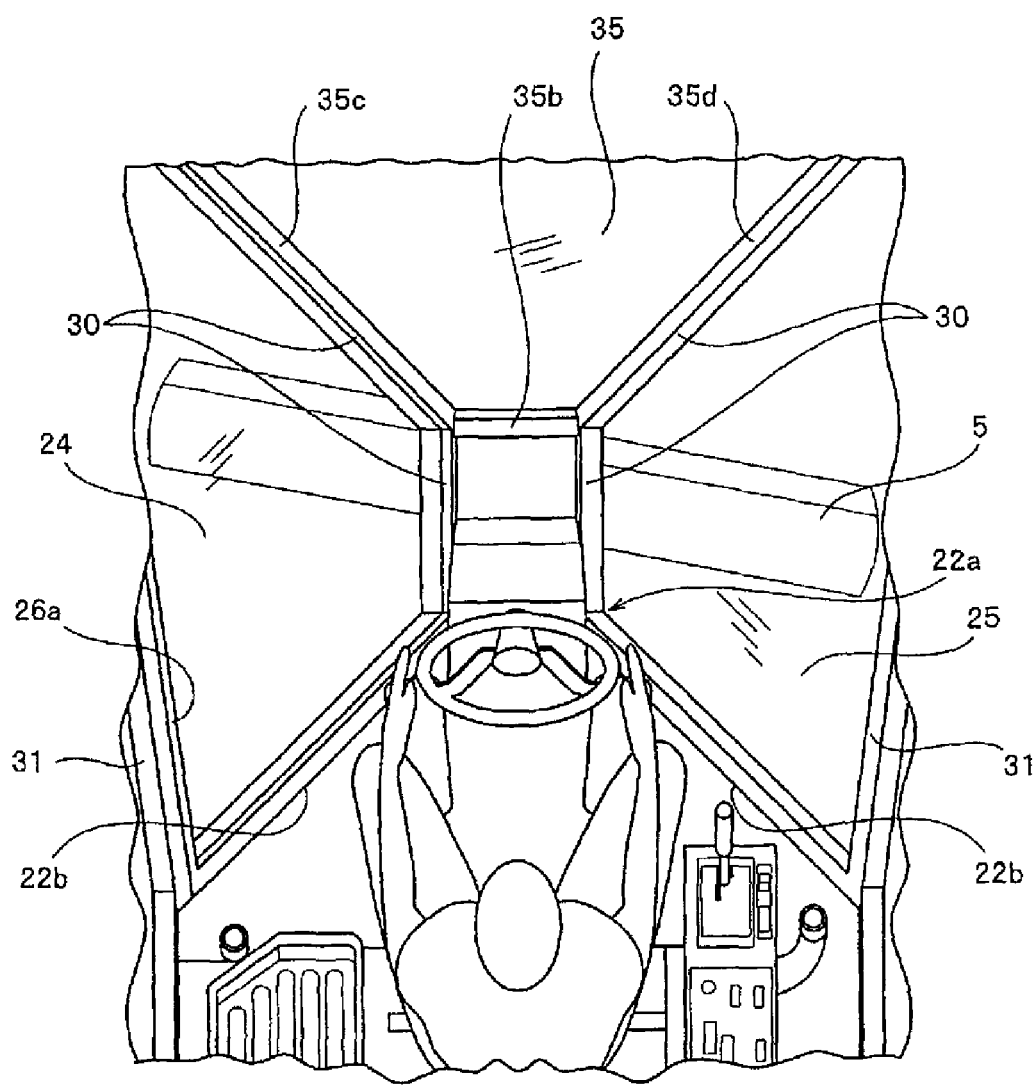
FIG. 3 is a perspective view showing a floor as viewed from the inside of the cab and a state of a blade as viewed through a lower front window (first embodiment)

FIG. 1 shows an outer appearance of a vehicle body front portion of a motor grader 1 as viewed from side. That is, FIG. 1 shows an outer appearance of the motor grader 1 on a front side of a front frame 2. FIG. 2 shows an outer appearance of a driving section 17 at the rear portion of the vehicle body. FIG. 3 is a front perspective view of a floor 22 as viewed from the inside of the cab 20 and a blade 5 as viewed through a lower front window 32.

A front portion of the vehicle body of the motor grader is provided with front wheels 4 and a blade 5 which carries out operation such as cutting earth as shown in FIG. 1. A rear portion of the vehicle body is provided with rear wheels 18 and a cab 20 as shown in FIG. 2. The front portion of the vehicle body is connected to the rear portion of the vehicle body through a front frame 2. The front frame 2 is connected to the rear portion of the vehicle body so that the front frame 2 can turn relative to the rear portion of the vehicle body in the horizontal direction.

The present invention is characterized in the layout structure of a front window 35 of a front surface and a pair of left and right side front windows 24 as described later. Thus, in FIG. 2, the rear wheels 18 and the cab 20 are schematically illustrated, and structures of rearview mirrors and an engine room are omitted. In FIG. 3, a structure of an operating lever is omitted, and the blade 5 in which a left side of the blade 5 is located forward and a right side is located backward is inclined in the longitudinal direction.

Generally, at the time of the land-readjusting work, the blade 5 is inclined at 30° to 45° with respect to the left and right direction. In the illustrated embodiment, the blade 5 is inclined at about 30° with respect to the left and right direction.

Other structure as the motor grader except the layout structure in the front surface of the cab is not limited to the structure described below, and other structure used as the motor grader can be employed.

As shown in FIG. 1, a front frame 2 in which the rear end is turnably connected to a rear portion of the vehicle (not shown) in the horizontal direction supports the pair of front wheels 4 through a front axle device 19 at a front end. The front frame 2 connects a tip end of a drawbar 3 through support means 15. The drawbar 3 is disposed such that it can swing around the support means 15 in the vertical direction and the lateral direction.

The support means 15 includes a turning mechanism which permits turning motion of at least two shafts. A ball joint mechanism, a trunnion mechanism or a universal joint mechanism can be used as the turning mechanism.

A pair of lift cylinders 11a and 11b and a lifter bracket 7 are disposed between the drawbar 3 and the front frame 2. One ends of the lift cylinders 11a and 11b are connected to the drawbar 3 through support means, respectively. The other ends of the lift cylinders 11a and 11b are connected to the lifter bracket 7 supported by the front frame 2 through the support means, respectively.

As a structure of the lift cylinders 11a and 11b connected to the lifter bracket 7, FIG. 1 shows a structure in which the ends of the lift cylinders 11a and 11b are connected to the lifter bracket 7. As the layout structure of the lift cylinders 11a and 11b and the lifter bracket 7, the ends of the lift cylinders 11a and 11b may project upward than the lifter bracket 7 and intermediate portions of the lift cylinders 11a and 11b may be connected to the lifter bracket 7.

The support means which connect the lift cylinders 11a and 11b to the drawbar 3 and the lifter bracket 7 includes turning mechanisms which permit turning motion of at least two or more shafts like the support means 15.

The lifter bracket 7 is turnably disposed with respect to the front frame 2 by a hydraulic motor or the like (not shown). A rotation shaft when the lifter bracket 7 turns is disposed such that it becomes a straight line substantially passing through a turning point in the support means 15 that is a connection point between the front frame 2 and the drawbar 3.

A drawbar shift cylinder 12 is disposed between the drawbar 3 and the lifter bracket 7. The lifter bracket 7 also has a function as a drawbar shift bracket 8 which connects one end of the drawbar shift cylinder 12. The one end of the drawbar shift cylinder 12 is connected to the lifter bracket 7 through the support means.

The other end of the drawbar shift cylinder 12 and the drawbar 3 are connected to each other through the support means. The support means also includes turning mechanisms which permits turning motion of at least two shafts like the support means 15.

A turning circle 9 is turnably disposed on the drawbar 3. The turning circle 9 is turned and driven by a circle rotating machine 16 mounted on the drawbar 3. The blade 5 is laterally and slidably supported by the turning circle 9. The blade 5 is provided with slide rails 5a. The slide rails 5a are slidably supported by a blade support 9a mounted on the turning circle 9.

A side shift cylinder 13 is disposed between the blade support 9a and the blade 5. The blade 5 is supported by the blade support 9a and in this state, the blade 5 can laterally slide by the expansion and contraction. A tilt cylinder 14 is provided between the blade 5 and the turning circle 9, and a tilt angle of the blade 5 can be controlled.

Next, a structure of a front surface of the cab 20 which is a structure of a characteristic portion of the present invention, and layout structures of an upper front window provided on a front surface of the cab 20 and a pair of left and right lower front window will be described using FIGS. 2 and 3.

The cab 20 mounted on the rear portion of the front frame 2 includes the hexagonal floor 22, a hexagonal roof 21, pairs of left and right A-pillars 30, B-pillars 31 and C-pillars 32 connecting between the floor 22 and the roof 21, and windows disposed on the A-pillars 30 to C-pillars 32. The floor 22 is of hexagon in shape as viewed from above, and both left and right ends of the floor 22 on a rectangular front side are diagonally cut.

The roof 21 is also of hexagon in shape as viewed from above, and both left and right ends of the roof 21 on a rectangular front side are diagonally cut.

The diagonally cut both left and right ends of the roof 21 and the diagonally cut both left and right ends of the floor 22 are parallel to each other. This is because that a later-described pair of side front windows 24 and 25 are mounted on these portions. The width of the roof 21 is greater than the width of the floor 22 as viewed from front.

A driver's seat 23, a steering wheel 36, an operation lever (not shown), a steering device and measuring instruments are disposed in the cab 20. The front window 35 is disposed in front of the front surface of the cab 20. The pair of side front windows 24 and 25 are disposed on left and right sides of the front window 35.

The pair of side front windows 24 and 25 are disposed closer to the front portion of the side portion of the cab 20. A pair of side windows 37 is disposed close to the rear portion of the side of the cab 20. A rear window 33 is disposed at a rear portion of the cab 20. The side front window 24 is also used as a door through which an operator can go into and come out from the cab 20.

That is, the front window 35 is disposed between the upper portions of the pair of A-pillars 30, and the side front windows 24 and 25 are disposed between the A-pillars 30 and the B-pillars 31. The side windows 37 are disposed between the B-pillars 31 and the C-pillars 32, and the rear window 33 is disposed between the C-pillars 32.

The side front window 24 is formed as a door for opening and closing a space between the A-pillar 30 and the B-pillar 31. A stationary vertical window frame 26a of a door window frame 26 constituting an outer frame of the door is mounted on the B-pillar 31 such that it can open and close through a hinge.

The door may be provided on each of both sides of the cab 20, or the door may be provided only on one side of the cab 20 as shown in FIG. 2. FIG. 2 shows the side front window 24 which also functions as the door disposed on the left side of the cab 20, a solid line in FIG. 2 shows that the side front window 24 is opened, and a dotted line in FIG. 2 shows that the side front window 24 is closed.

Spaces between the pair of B-pillars 31 and the pair of C-pillars 32 have such shapes that a width thereof is increased upward. That is, the outer shape of the roof 21 is greater than the outer shape of the floor 22. With this structure, a space where an operator can move his or her arms is widened in an upper portion in the cab 20, and the operator can operate in the cab 20 without feeling oppression.

In FIG. 2, a solid line shows that the side front window 24 is locked toward the rear portion of a side of the cab 20 by a lock mechanism (not shown), and a phantom line shows that the side front window 24 as the door is closed and locked.

The front window 35 is formed into a reversed trapezoidal shape, in which an upper window frame 35a of the front window 35 is wider than a lower window frame 35b thereof. The width of the lower window frame 35b can be configured to be slightly greater than that of the front frame 2. When the width of the front frame 2 is about 350 mm for example, the width of the lower window frame 35b may be about 400 mm.

A position of the lower window frame 35b may be lower than an upper surface of a horizontal portion of the drawbar shift bracket 8 shown in FIG. 1. With this structure, it is possible to prevent the forward view from being hindered by the lower window frame 35b, and it is unnecessary to form a window below the front window 35.

By making the width of the lower window frame 35b small, it is possible to secure the forward and downward view, and to make the width of the upper window frame 35a of the front window 35 wide. That is, as shown in FIG. 3, the lateral width in the left and right direction at the point of view of the operator facing forward in their seated position can be made wide. Therefore, it is possible to easily and safely check the forward state at the time of running. The visibility of a road surface to be readjusted behind the blade becomes excellent.

The width of the roof 21 is wider than that of the floor 22 as viewed from front. Therefore, a difference in width between the lower window frame 35b and the upper window frame 35a is further increased, and an effect obtained by this structure becomes more remarkable.

Upper portions of the A-pillars 30 are used also as both side window frames 35c and 35d of the front window 35. The upper window frame 35a of the front window 35 is mounted on a front edge of the roof 21. The lower window frame 35b is used also as across rail which connects the A-pillars 30 in the intermediate portion 30b of the A-pillars 30.

A portion of the roof 21 can be used as the upper window frame 35a of the front window 35, or both the side window frames 35c and 35d of the front window 35 and the A-pillars 30 may be formed as separate bodies and both the side window frames 35c and 35d may be mounted on the A-pillars 30.

Since both the left and right ends of the roof 21 are diagonally cut, the width of the upper window frame 35a of the front window 35 becomes shorter as the inclination angle of the front window 35 becomes smaller, and the forward view is deteriorated.

If the rearward inclination angle of the front window 35 is set excessively large, the reflection of the sunlight on the front window 35 becomes strong, and forward view through the front window is deteriorated due to influence of the sunlight.

Thus, it is desirable that the rearward inclination angle of the front window 35, i.e., an inclination angle formed between the vertical direction and the front window 35 as viewed from side is 15° to 20°. With this structure, the A-pillar 30 is formed into ">" as viewed from right side of the cab 20 and into "<" as viewed from left side of the cab 20.

In the A-pillar 30, an inclination angle of a portion thereof from the intermediate portion 30b to a bottom 30c with respect to a portion thereof from an upper portion 30a to an intermediate portion 30b can be set using a relation widths between the front frame 2 and the side window frame of front sides of the side front windows 24 and 25.

In a state where the side front window 24 which functions as the door is closed, open-side vertical window frames 26b and 26c of the side front window 24 are in abutment along the A-pillar 30, and the stationary vertical window frame 26a mounted on the B-pillar 31 through a hinge (not shown) is disposed in parallel to the B-pillar 31 in adjacent to the B-pillar 31. The upper window frame of the side front window 24 is in abutment against the roof 21, and the lower window frame of the side front window 24 is in abutment against the floor 22.

Similarly, the front side window frame of the side front window 25 is in abutment against the A-pillar 30, and a rear side window frame of the side front window 25 is in abutment against the B-pillar 31. The upper window frame of the side front window 25 is in abutment against diagonally cut both left and right ends of the front side of the roof 21. The lower window frame of the side front window 25 is in abutment against diagonally cut both left and right ends of the front side of the floor 22.

Figure 4:
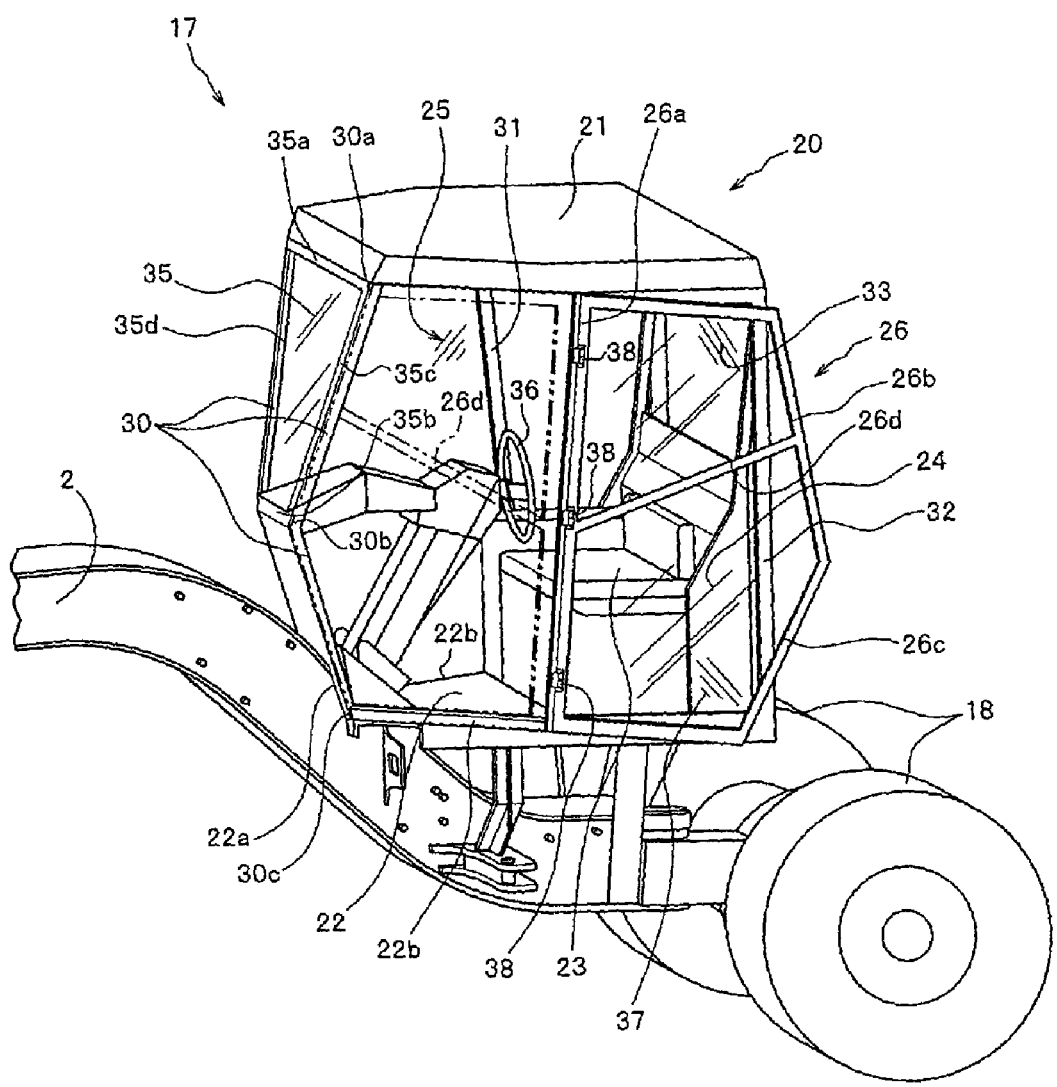
FIG. 4 is a perspective view of another driving section (first embodiment)
Figure 5:
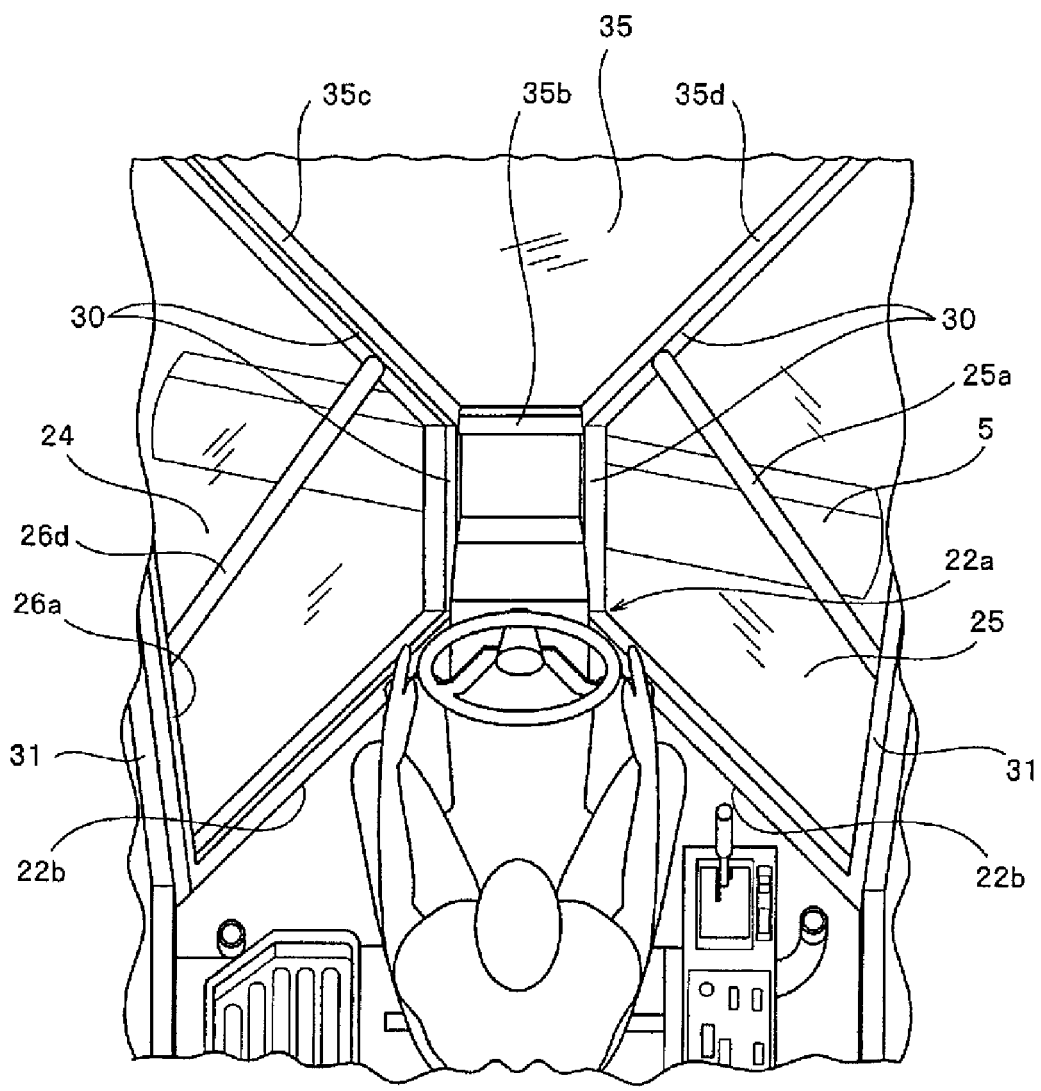
FIG. 5 is a perspective view as viewed from the inside of another cab (first embodiment).

As the pair of side front windows 24 and 25, large windows can be formed using a single flat plate glass. As shown in FIGS. 4 and 5, as the pair of side front windows 24 and 25, cross rails 25a and 26d may be formed between the side window frames and two flat plate glasses may be used as the pair of side front windows 24 and 25 instead of using a single plate glass.

A structure shown in FIG. 4 is different from that shown in FIG. 2 in that the cross rails 25a and 26d are added to the structure shown in FIG. 2, but other structure is the same as that shown in FIG. 2. A structure shown in FIG. 5 is different from that shown in FIG. 3 in that the cross rails 25a and 26d are added to the structure shown in FIG. 3, but the other structure is the same as that shown in FIG. 3.

Next, forward view and working view from the inside of the cab 20 will be described using FIGS. 3 and 5. As shown in FIGS. 3 and 5, the width of the lower window frame 35b of the front window 35 can be as small as the width of the front frame 2, and the upper window frame 35a (not shown in FIGS. 3 and 5) can be made wide in width. With this structure, the lateral width in the left and right direction at the point of view of the operator facing forward in their seated position can be made wide.

Therefore, it becomes possible to widely check the forward state through the front window 35 at the time of running, and to easily check the safety at the time of running. Further, the forward view that should always be checked at the time of running is not split due to influence of the A-pillar 30. Thus, the operator can control the running state without inclining his or her body laterally while sitting on the driver's seat.

Further, the side front windows 24 and 25 can be formed large, and a function in which the forward view of the lower portion of the floor 22 is formed wide can effectively be utilized using a cut section 22b formed on the front end of the floor 22. With this structure, wide rearward view of the blade 5 can be secured. Thus, an operator can reliably judge the land-readjusting working state by the blade 5 while sitting on the driver's seat, and the land-readjusting work can efficiently be carried out.

Even if the cross rails 25a and 26d are formed on the side front windows 24 and 25 as shown in FIG. 5, the forward view and the working view are not hindered by the cross rails 25a and 26d.

By the cab structure according to the present invention, the operability of the work is largely enhanced, and an operator can safely operate the construction machine without fatigue.

Further, the front window 35 and the pair of left and right side front windows 24 and 25 can be formed large, and the large window can be disposed on the front surface of the cab 20. Therefore, it is possible to make a driver feel that the living space is wide and open. As the size of the front window and the side front window, the size is set such that a wiper can be mounted for the operation. Thus, it is possible to sufficiently secure the forward view and the working view in the event of rain.

Since one side front window 24 can be formed as the door through which an operator can go into and come out from the cab 20, the cab 20 can be provided with the large door. Further, since the large rear window 29 can be disposed between the pair of C-pillars 32, the rearward view from the inside of the cab 20 can be maintained excellent.

The structure from the intermediate portion 30b of the A-pillar 30 to the bottom 30c can be formed three-dimensionally between the flat side front windows 24 and 25. With this, the structure can be obtained in terms of design.

Although the pair of side front windows 24 and 25 are laterally symmetrically with respect to the vertical surface including the longitudinal axis of the vehicle body in the illustrated example, the sizes of the left and right side front windows 24 and 25 may be different from each other, or the inclination angles of the left and right side front windows 24 and 25 in the horizontal direction, the vertical direction or the left and right direction may be different from each other.

When both the ends of the tip end of the floor 22 are diagonally cut, if the cut shapes of the left and right ends are different from each other, the sizes and the inclination angles in the left and right direction of the left and right side front windows 24 and 25 can be different from each other.

Industrial Applicability

The technical idea of the present invention can be applied to an apparatus and the like to which the technical idea of the invention can be applied.

The invention claimed is:

1. A cab for a construction machine, comprising:
    a floor including a front side having a left end and a right end, wherein both the left end and the right end of the front side of the floor of the cab are diagonally cut forward;
    a roof including a front side having a left end and a right end, wherein both the left end and the right end of the front side of the roof of the cab are diagonally cut forward;
    a front surface;
    a front window provided on the front surface of the cab, the front window including an upper window frame and a lower window frame, wherein when the upper window frame of the front window is in an upper side and a lower window frame of the front window is in a lower side as viewed from front, the front window is formed into a trapezoidal shape in which a width of the upper side is wider than a width of the lower side, and the upper window frame is disposed rearward of the lower window frame as viewed from side;
    a left side front window and a right side front window in which upper and lower window frames are disposed along both the left end and the right end of the floor which are diagonally cut forward and along both the left end and the right end of the roof which are diagonally cut forward; and
    a left side window and a right side window, having corresponding side window frames that have respective front sides and upper end sides, wherein the upper end sides of the side window frames on the front sides of the side window frames are disposed along both left and right side windows of the front window.

2. The cab for the construction machine according to claim 1, wherein the front window is inclined rearward at 15° to 20° with respect to a vertical direction as viewed from side.

3. A construction machine including a cab mounted thereon, the cab comprising:
    a floor including a front side having a left end and a right end, wherein both the left end and the right end of the front side of the floor of the cab are diagonally cut forward;
    a roof including a front side having a left end and a right end, wherein both the left end and the right end of the front side of the roof of the cab are diagonally cut forward;
    a front surface;
    a front window provided on the front surface of the cab, the front window including an upper window frame and a lower window frame, wherein when the upper window frame of the front window is in an upper side and a lower window frame of the front window is in a lower side as viewed from front, the front window is formed into a trapezoidal shape in which a width of the upper side is wider than a width of the lower side, and the upper window frame is disposed rearward of the lower window frame as viewed from side;
    a left side front window and a right side front window in which upper and lower window frames are disposed along both the left end and the right end of the floor which are diagonally cut forward and along both the left end and the right end of the roof which are diagonally cut forward; and
    a left side window and a right side window, having corresponding side window frames that have respective front sides and upper end sides, wherein the upper end sides of the side window frames on the front sides of the side window frames are disposed along both left and right side windows of the front window.

4. A motor grader including a cab mounted thereon, the cab comprising:
    a floor including a front side having a left end and a right end, wherein both the left end and the right end of the front side of the floor of the cab are diagonally cut forward;
    a roof including a front side having a left end and a right end, wherein both the left end and the right end of the front side of the roof of the cab are diagonally cut forward;
    a front surface;
    a front window provided on the front surface of the cab, the front window including an upper window frame and a lower window frame, wherein when the upper window frame of the front window is in an upper side and a lower window frame of the front window is in a lower side as viewed from front, the front window is formed into a trapezoidal shape in which a width of the upper side is wider than a width of the lower side, and the upper window frame is disposed rearward of the lower window frame as viewed from side;
    a left side front window and a right side front window in which upper and lower window frames are disposed along both the left end and the right end of the floor which are diagonally cut forward and along both the left end and the right end of the roof which are diagonally cut forward; and
    a left side window and a right side window, having corresponding side window frames that have respective front sides and upper end sides, wherein the upper end sides of the side window frames on the front sides of the side window frames are disposed along both left and right side windows of the front window.

5. The construction machine of claim 3, wherein the front window is inclined rearward at 15° to 20° with respect to a vertical direction as viewed from side.

6. The motor grader of claim 4, wherein the front window is inclined rearward at 15° to 20° with respect to a vertical direction as viewed from side.

* * * * *